United States Patent
Arnoux et al.

(10) Patent No.: US 6,416,317 B1
(45) Date of Patent: *Jul. 9, 2002

(54) OXY-FUEL BURNER

(75) Inventors: Stéphane Arnoux, Plaisir; Dominique Robillard, Versailles, both of (FR)

(73) Assignee: L'Air Liquide Societe Anonyme A Directoire et Conseil de Surveillance Pour l'Etude et l'Exploitation des Procedes Georges Claude, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,669

(22) Filed: Nov. 19, 1998

(30) Foreign Application Priority Data

Dec. 2, 1997 (FR) .............................. 97 15162

(51) Int. Cl.⁷ ................................ F23N 5/08
(52) U.S. Cl. .................... 431/79; 431/75; 431/181; 431/154; 431/264; 431/353; 431/13; 431/189
(58) Field of Search ............... 431/79, 78, 75, 431/13, 181, 186, 189, 263, 264, 154, 278, 285, 116, 353, 350; 340/578, 579

(56) References Cited

U.S. PATENT DOCUMENTS

| | | | | |
|---|---|---|---|---|
| 1,412,023 A | * | 4/1922 | Erickson | 431/186 |
| 3,280,882 A | * | 10/1966 | Hemker | 431/79 |
| 3,617,159 A | * | 11/1971 | Arndt | 431/79 |
| 4,039,844 A | * | 8/1977 | MacDonald | 340/578 |
| 4,105,393 A | * | 8/1978 | Boylett | 431/116 |
| 4,595,353 A | * | 6/1986 | De Haan | 431/79 |
| 4,815,966 A | * | 3/1989 | Janssen | 431/285 |
| 4,892,475 A | | 1/1990 | Farrenkopf et al. | |
| 5,073,105 A | * | 12/1991 | Martin et al. | 431/116 |
| 5,263,851 A | * | 11/1993 | Hosome et al. | 431/79 |
| 5,317,165 A | * | 5/1994 | Montagna | 340/578 |
| 5,488,355 A | * | 1/1996 | Tindall et al. | 431/79 |
| 5,545,031 A | * | 8/1996 | Joshi et al. | 431/187 |
| 5,620,316 A | * | 4/1997 | Duboudin et al. | 431/353 |
| 5,772,427 A | * | 6/1998 | Laurenceau et al. | 431/154 |
| 6,123,542 A | * | 9/2000 | Joshi et al. | 431/353 |

FOREIGN PATENT DOCUMENTS

| | | |
|---|---|---|
| EP | 0 628 769 A1 | 12/1994 |
| EP | 0 677 706 A1 | 10/1995 |
| FR | 2226055 | 11/1974 |
| WO | WP 91/19942 | 12/1991 |

* cited by examiner

Primary Examiner—Henry Bennett
Assistant Examiner—Josiah C. Cocks
(74) Attorney, Agent, or Firm—Burns, Doane, Swecker & Mathis, L.L.P.

(57) ABSTRACT

The oxy-fuel burner comprises at least one fuel supply pipe (16) and at least one pipe (18) for supplying an oxygen-rich gas, the said outlets of the pipes being directed approximately in the same direction, the burner being designed to be mounted through a wall of a furnace with the pipes directed into the furnace. It carries at least one auxiliary member (50, 60) intended to act on the flame and the said auxiliary member (50, 60) is placed on the burner upstream of the zone where the fuel gas and the oxygen-rich gas meet.

20 Claims, 3 Drawing Sheets

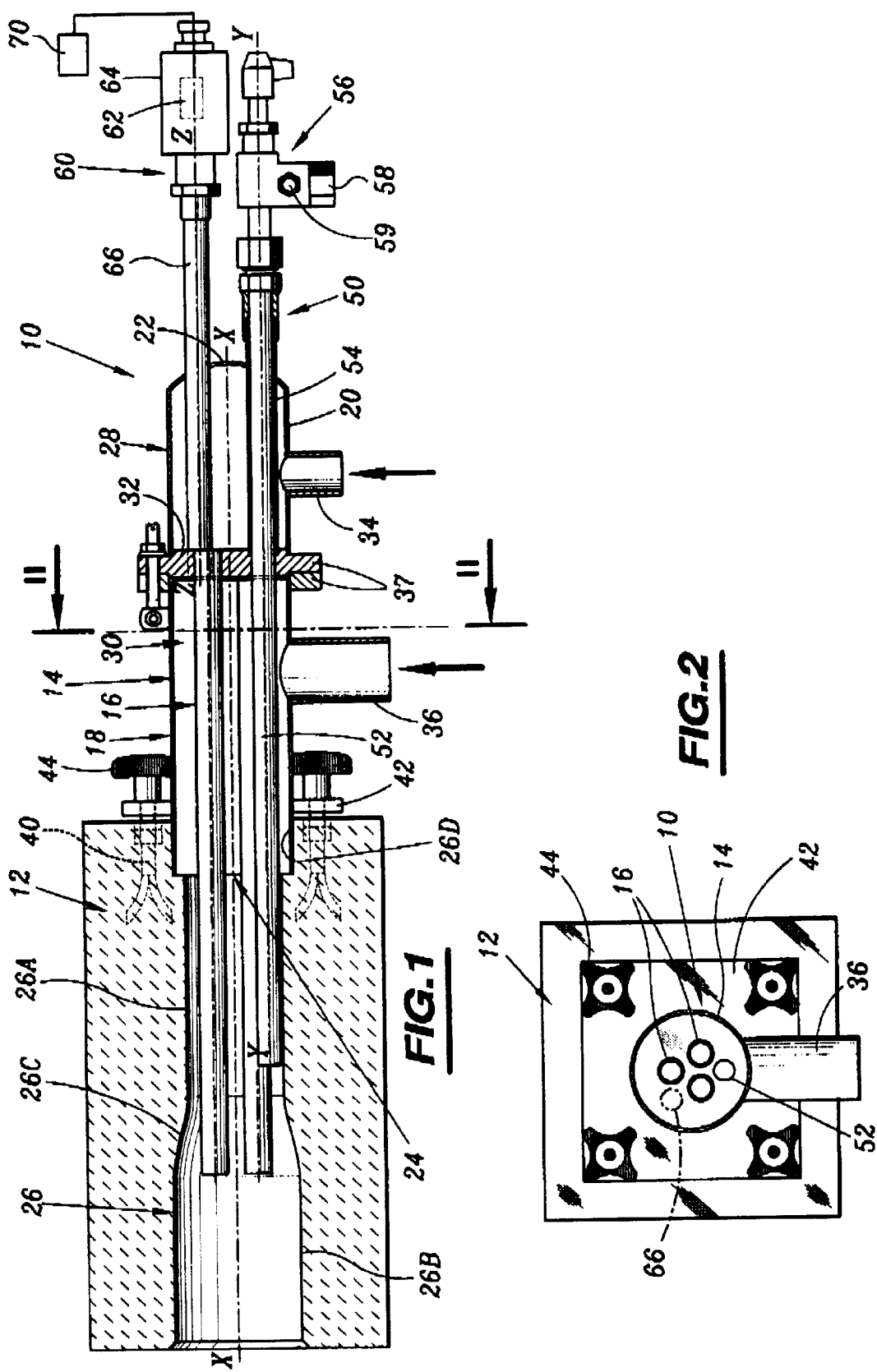

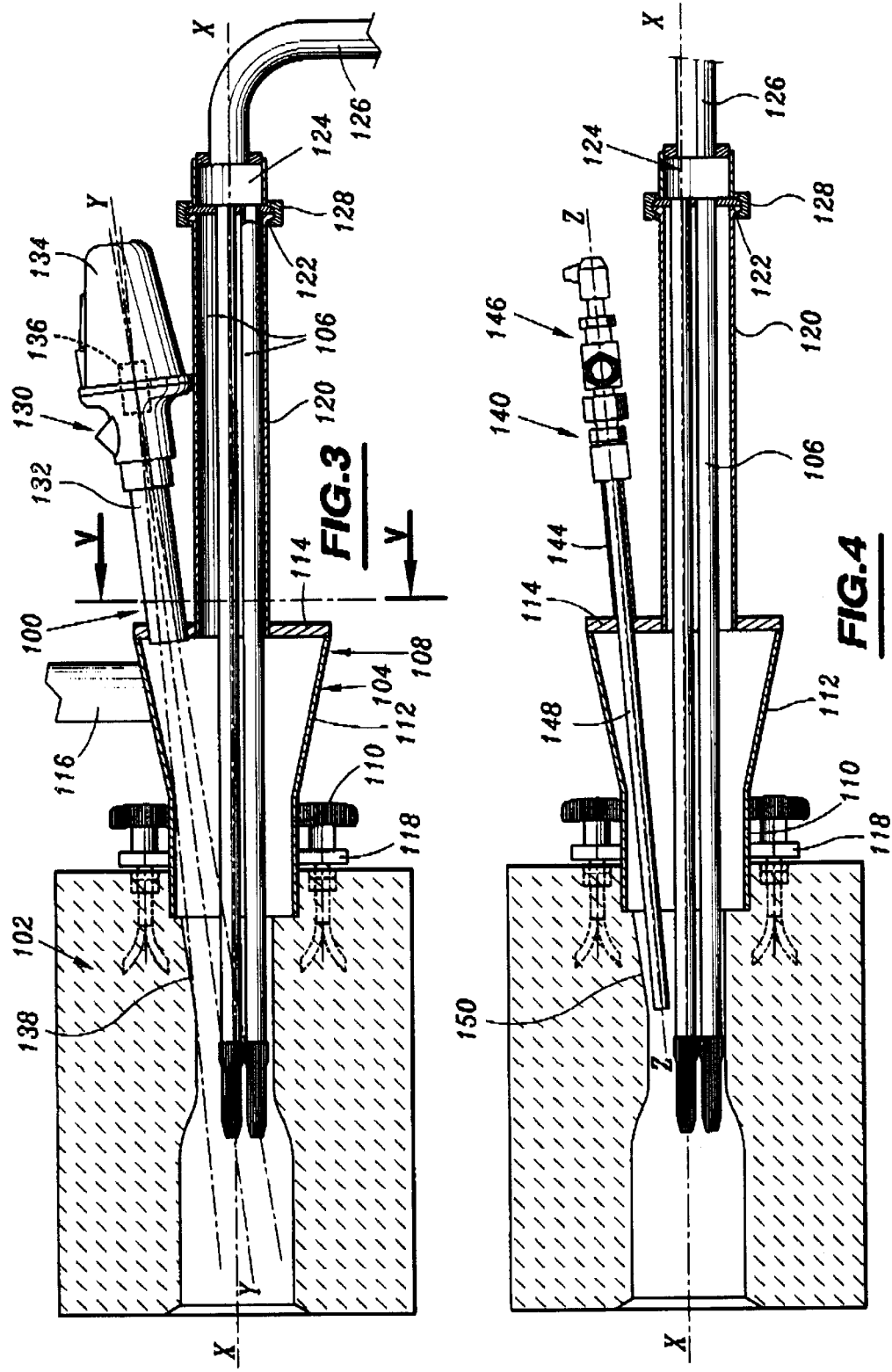

OXY-FUEL BURNER

FIELD OF THE INVENTION

The present invention relates to an oxy-fuel burner of the type comprising at least one fuel supply pipe and at least one pipe for supplying an oxygen-rich gas, the said outlets of the said pipes being directed approximately in the same direction, the burner being designed to be mounted through a wall of a furnace with the pipes directed into the furnace.

BACKGROUND OF THE INVENTION

Such burners are used especially in furnaces for melting enamels or for melting aluminum. They are placed through the wall of the furnace via a brick right through which passes a hole, this brick being called a quarl. The outlet ends of the fuel supply pipe and of the oxygen-rich gas supply pipe emerge in the passage of the quarl. The latter generally has a profile which diverges into the furnace. The root of the flame is located within the quarl in the zone where the fuel and the oxygen-rich gas meet and mix.

In order to allow a burner to be ignited in an enclosure in which the temperature is below the spontaneous ignition temperature of the fuel, it is necessary to use a device for igniting the burner. Such a device is therefore known to be provided in the wall of the furnace. In order for the ignition device to be close to the zone where the fuel and the oxygen-rich gas meet, the igniting device is generally placed in a duct provided in the quarl and emerging in the passage passing through the latter.

Likewise, in order to check the presence of the flame at the outlet of the burner, it is known to provide means for detecting ultraviolet radiation near the flame retention zone. These means comprise, for example, a cell for detecting ultraviolet radiation. This cell is housed in a duct made in the quarl and emerging in the passage of the latter.

Quarls are made of refractory. The presence of ducts emerging in the passage passing through the quarls weakens the structure of them. In addition, these emerging ducts cause the flow conditions of the gas stream inside the divergent passage to degrade.

SUMMARY OF THE INVENTION

The object of the invention is to solve the abovementioned problem by providing a burner equipped With auxiliary devices, such as an igniting device or a device for analysing the flame, without this impairing the mechanical strength of the quarl and the quality of the flow of the gases through the latter.

For this purpose, the subject of the invention is an oxy-fuel burner of the aforementioned type, characterized in that it carries at least one auxiliary member intended to act on the flame, and in that the said auxiliary member is placed on the burner upstream of the zone where the fuel gas and the oxygen-rich gas meet.

Depending on the particular embodiments, the burner comprises one or more of the following characteristics;

it comprises a body containing the said pipes, which body is open only towards the inside of the furnace and comprises at least one tap for connection to a supply for feeding with oxygen-rich gas, the body thus defining the said oxygen-rich gas supply pipe, the body is penetrated by the or each fuel supply pipe and the or each auxiliary member is attached to the body so that it is swept with the flow of oxygen-rich gas when feeding the burner with oxygen-rich gas;

the or each fuel supply pipe passing through the body is removably mounted on the latter;

the or each auxiliary member has a main operating axis and the or each main axis defines, with the said outlet direction of the pipes, an angle of between 0and 45° and advantageously of between 0 and 20°;

the or each auxiliary member is oriented in order to act in the flame retention zone;

one of the auxiliary members comprises a device for igniting the flame;

the device for igniting the flame comprises a tube for supplying an igniting flame, which tube has its outlet end placed at a distance of between 2 and 10 cm upstream of the zone where the fuel meets the oxygen-rich gas;

one of the auxiliary members comprises a window;

one of the auxiliary members comprises a device for analysing the flame; and the said device for analysing the flame comprises a cell for measuring the light intensity produced by the flame in the ultraviolet zone and the said cell is connected to means for comparing the measured intensity with at least two predetermined threshold values in order to deduce therefrom that the burner is in an incorrect operating state.

BRIEF DESCRIPTION OF THE FIGURES OF THE DRAWING

The invention will be more clearly understood on reading the description which follows, given solely by way of example and with reference to the appended drawings in which:

FIG. 1 is a longitudinal sectional view of a burner according to the invention fitted into a glass-furnace quarl;

FIG. 2 is a cross-sectional view of the burner of FIG. 1 on the line II—II;

FIG. 3 and 4 are longitudinal sectional views of an alternative embodiment of the burner according to the invention, these cross sections being made on the lines III—III and IV—IV of FIG. 5.

DETAILED DESCRIPTION OF THE PREFERRED EMBODIMENTS

Figure 5:
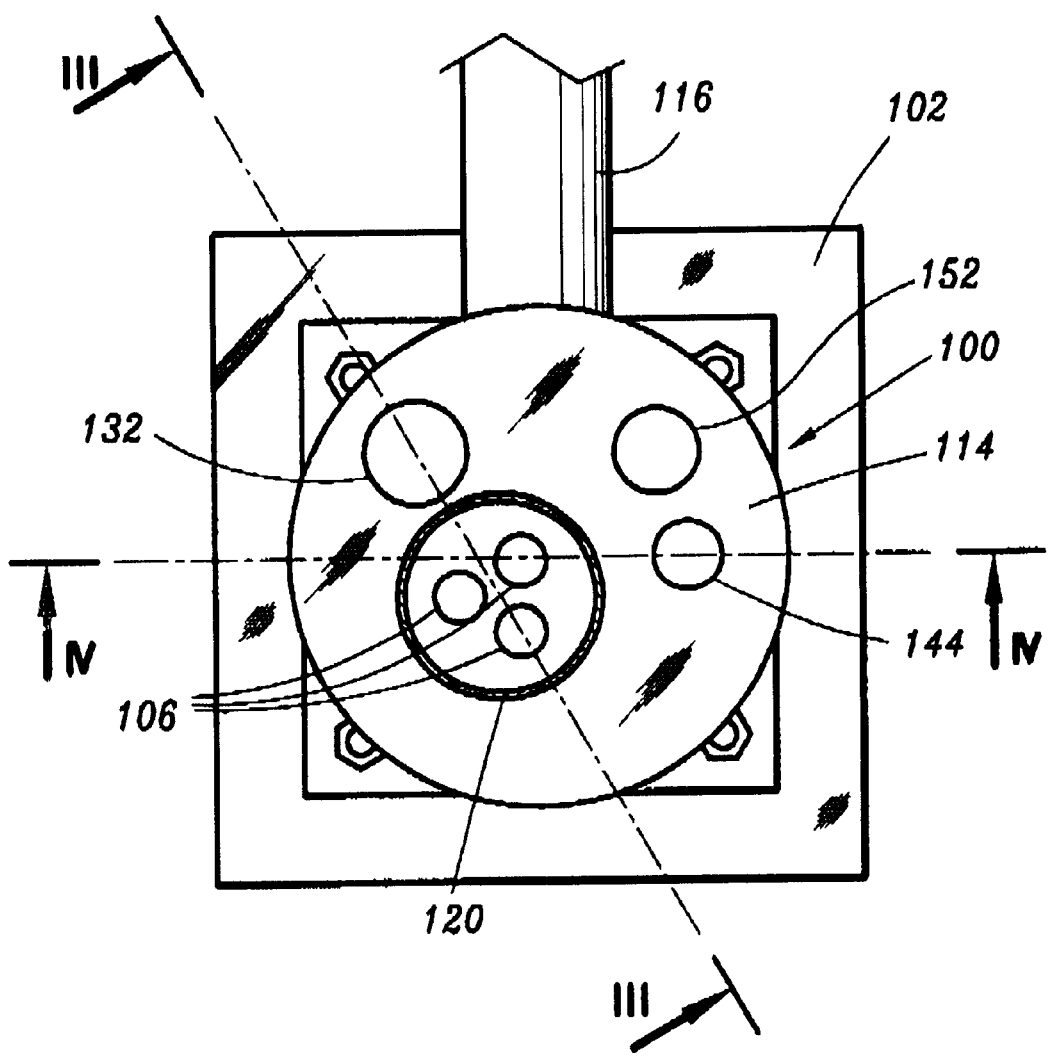
FIG. 5 is a cross-sectional view of the burner of FIGS. 3 and 4 on the line V—V of FIG. 3.

FIG. 1 shows an oxy-fuel burner 10 combined with a quarl 12.

The burner 10 comprises a body 14 containing three pipes or tubes 16 for supplying a fuel gas into the quarl. The body 14 delimits a pipe 18 for supplying impure oxygen into the quarl.

The body 14 comprises a shell or casing 20 of cylindrical general shape of axis X—X. It is closed off at its rear end by an end wall 22 in the form of a spherical cap. The shell 20 opens out over its entire cross section at its front end in an opening 24 which communicates with a passage 26 passing through the quarl.

The shell 20 defines two successive chambers, denoted 28 and 30. These two chambers are separated by a transverse wall 32.

This chamber 28 extends between the wall 32 and the end wall 22, while the chamber 30 extends between the wall 32 and the opening 24. The chamber 2B is intended to receive fuel gas coming from a tap 34 made in the side wall of the shell 20. The tap 34 emerges directly into the chamber 28 and comprises means, not shown, for connection to a fuel gas supply.

The three pipes 16 are formed by three tubes of the same length, these extending so as to be parallel with one another and defining, in cross section, an equilateral triangle. These three tubes communicate with the fuel gas chamber 28 through the wall 32. They extend parallel to the axis of the body 14 and pass right through the chamber 30.

The ends of the three pipes 16 project from the body 14 and emerge axially in the passage 26 of the quarl.

The chamber 30 is intended to receive oxygen-rich gas conveyed by a side tap 36 passing through the side wall of the shell 20. The tap 36 emerges directly in the chamber 30 and comprises means, not shown, for connection to a supply of oxygen-rich gas, for example of impure oxygen obtained by air distillation. The cylindrical side wall of the body defines, over the length of the chamber 30, the oxygen-rich gas supply pipe 18 which emerges in the passage 26 of the quarl via the opening 24.

Advantageously, the shell 20 is made in two coaxial parts connected to each other at the wall 32 by two flanges 37 and a set of bolts.

The quarl 12 consists of a brick, made of refractory, having a parallelepipedal external shape. The passage 26 passes right through the quarl in its longest direction. This passage comprises an inlet, considering the flow direction of the gases, a cylindrical portion 26A of smaller cross section extended on the outlet side by a coaxial cylindrical portion 26B of larger diameter. The two portions 26A, 26B are connected to each other by a divergent portion 26C in which the diameter of the passage gradually increases in the flow direction of the gases, On the inlet side, the portion 26A comprises a counterbore 26D, the external diameter of which is slightly greater than the external diameter of the side wall of the shell 20.

Furthermore, the quarl comprises, on its face external to the furnace, four anchoring pins 40 embedded in the refractory, the projecting end of the pins being formed by a length of threaded rod.

In order to fasten the burner into the quarl, the shell 20 comprises, on the outside, a flange 42 provided with holes for receiving the threaded portions of the anchoring pins 40, so as to ensure that the burner is fastened to the quarl by means of four nuts 44.

As shown in FIG. 1, the outlet end of the three pipes 16 lies approximately in the diverging portion 26c.

According to the invention, the body comprises two auxiliary members intended to act on the flame. These members are placed upstream of the zone where the fuel gas and the oxygen-rich gas meet.

In particular, the body carries a device 50 for igniting the flame. This device comprises a pipe 52 for supplying a fuel mixture. It extends along the axis Y—Y parallel to the axis X—X of the burner. The pipe 52 passes right through the chamber 28, through a tunnel 54 bounded by a larger-diameter coaxial tube connecting the end wall 22 to the wall 32.

The pipe 52 is provided at its rear end, that is to say its end projecting externally away from the end wall 22, with premixing means 56 for supplying the opposite end of the pipe 52 with the fuel mixture. These means, of any suitable type, comprise a connector 58 for connection to a supply of fuel, not shown, for example of natural gas or propane, and an air inlet 59.

The tube 52 emerges at its free end in the quarl upstream of the outlet and of the three tubes 16. The distance separating the outlet ends of the three pipes 16 from that of the tube 52, measured along the axis X—X, is advantageously between 2 and 10 cm and is, for example, equal to 5 cm.

Moreover, the burner comprises a second auxiliary member, denoted 60, formed by a device for analysing the flame. This device comprises a cell 62 for measuring the light intensity of the flame for wavelengths corresponding to the ultraviolet. This cell is housed in a cylindrical housing 64 open at one end. It is extended by a tube 66 passing right through the chamber .28. Thus, the tube 66 passes, on the one hand, through the end wall 22 and, on the other hand, through the transverse wall 32 in order to emerge freely in the chamber 30.

The axis Z—Z of the tube 66 extends so as to be parallel to the axis X—X of the burner and the cell 62 is placed along the axis Z—Z.

As shown in FIG. 2, the tubes 52 and 66 are angularly interleaved between two fuel gas supply pipes 16. In this figure, the position of the tube 66 is shown as a dot-dashed line since it is not in fact in the plane of the section.

At its rear end, the housing 64 comprises a sealed outlet passage for electrical wires connecting the cell 62 to a data-processing unit 70.

The data-processing unit 70 is designed to analyse the operation of the burner for the purpose of detecting anomalies, For this purpose, it comprises, for example, an analog-to-digital converter which converts the signals coming from the cell 62 into a digital signal. The analog-to-digital converter is linked to a logic unit comprising, for example, a microprocessor.

The latter is programmed so as to compare the intensity I measured by the cell 62 with a set of at least two predetermined threshold values in order to deduce therefrom a possible incorrect state of operation of the burner.

In particular, the set of threshold values comprises at least a first threshold value $I_1$, for example equal to approximately 115% of the normal intensity $I_0$ of operation of the burner. If the intensity measured by the cell exceeds this first threshold value $I_1$, the data-processing unit 70 deduces that flame entry in the burner occurs upstream of the portion 26B, which constitutes a risk of the structure of the latter being destroyed.

A second threshold value $I_2$, corresponding, for example, to 85% of the normal intensity $I_0$ of operation of the burner, makes it possible to detect any flame detachment, or fouling of the pipe 16, if the intensity measured by the cell 62 is below this second predetermined threshold value $I_2$.

The burner shown in FIGS. 1 and 2 operates in the following manner. In order to ignite the burner, the igniting device 50 is firstly actuated. For this purpose, the premixing means 56 are fed with a fuel mixture so that the latter flows to the open end of the tube 52. A spark is generated at the open end of the tube 52 by means of a piezoelectric element, not shown, so as to ignite the mixture.

In order to ignite the burner proper, the latter is fed with fuel gas, for example natural gas (formed essentially from methane) via the tap 34. At the same time, the burner is fed with impure oxygen via the tap 36.

It will be understood that the fuel gas fills the chamber 28 and then flows through the three pipes 16. Oxygen fills the chamber 30 and then flows directly to the open end of the shell 20 into the small-diameter portion 26A of the passage passing through the quarl.

When the oxygen and the natural gas come into contact with each other in the zone located downstream both of the oxygen supply pipe 18 bounded by the side wall of the shell and upstream of the outlet of the three pipes 16, the fuel gas bursts into flame on contact with the oxygen under the action of the flame maintained at the end of the tube 52.

It will thus be understood that the flame of the burner is created at the outlet end of the three pipes 16 in the widened portion 26B of the quarl forming the fuel gas/oxygen mixing zone.

The igniting device 50 may then be stopped so that the igniting flame is extinguished.

During operation of the burner, the photoelectric cell 62 continuously measures the light intensity radiated in the ultraviolet by the flame in its retention zone. As explained above, the measured intensity is compared with the predetermined threshold values $I_1$ and $I_2$ in order to detect any possible anomaly in the operation of the burner, Since the auxiliary members 50 and 60 are placed upstream of the fuel gas/oxygen mixing zone, during operation of the burner these members are in contact with at most only one of the gases. Thus, they are not exposed directly to the heat of the flame maintained at the end of the burner.

The risks of damaging the tube 52 or the cell 62 are therefore reduced.

In addition, the tube 52, or the end of the device for analysing the flame, is permanently swept by the flowing stream of oxygen. Thus, the latter are continuously cooled, thereby considerably reducing the risks of them being destroyed by the action of the heat radiated by the flame.

Moreover, since in the devices of the prior art the igniter or the device for analysing the flame are placed in auxiliary ducts made in the quarl and emerging in the passage passing through the latter, it is necessary to ensure that there is flow of a cooling gas stream in the duct in which the auxiliary member is housed in order for it to be continuously cooled. The gas used for the cooling is generally air.

The influx of such cooling streams is prejudicial to the proper operation of the furnace and may be the cause of significant pollution, especially due to nitrogen oxides when the cooling stream is one of air, the nitrogen in the air reacting with the oxygen introduced into the furnace.

With the burner according to the invention, the fact that the auxiliary members are not swept with air considerably reduces the production of nitrogen oxide.

FIGS. 3 to 5 show an alternative embodiment of the burner, denoted by the reference 100, fitted into a quarl 102.

The quarl 102 is largely similar to the quarl 12 of the previous embodiment and only the additional characteristics will be described in the rest of the description.

The burner 100 comprises, on the one hand, a body 104 bounded by a pipe for conveying an oxygen-rich gas to the inlet of the quarl and, on the other hand, a set of three pipes or tubes 106 for conveying a fuel gas.

The body 104 is bounded by an axisymmetric shell 108 of axis X—X comprising, at the front, a cylindrical portion 110 for connection to the quarl. The portion 110 is extended upstream by a frustoconical portion 112, the diameter of which gradually increases as far as an end wall 114.

A tap 116 for connection to an oxygen-rich gas supply, not shown, is made on the side wall of the frustoconical portion 112.

In order to fasten the burner to the quarl, the connection portion 110 has an external flange 118 similar to the flange 42 of the embodiment in FIGS. 1 and 2.

The end wall 114 is penetrated by a tube 120 which extends only to the outside of the shell 108 parallel to the axis X—X. This tube is intended to support the three injection tubes 106.

At its free end, it has a flange 122 designed to receive an end fitting 124 carrying the three tubes 106. The end fitting 124 is extended by a pipe 126 for connection to a fuel gas supply, not shown. The end fitting 124 is connected to the flange 122 by means of a removable retention ring 128.

The ring 128 ensures that there is a sealed connection between the tube 120 and the end fitting 124. In addition, it provides mechanical retention of the tubes 106 strictly along a direction parallel to the axis X—X of the burner, Moreover, as shown in FIG. 3, a flame-analysing device 130 is mounted on the rear wall 114. This device comprises a connection tube 132 emerging inside the body 104. At its free end, the tube 132 carries a sealed housing 134 in which a cell 136 for measuring the light intensity in the ultraviolet range is confined. This cell is directed along the axis Y—Y of the tube 132. The axis Y—Y defines an angle of 7.5° with the axis X—X of the burner. The cell 136 is linked to a data-processing unit similar to the unit 70.

As shown in FIG. 3, the axis Y—Y meets the axis X—X of the burner approximately in the outlet plane of the injection tubes 106, that is to say in the flame retention zone.

In order to clear the line of sight of the cell 136, the first portion, of smaller cross section, of the quarl 102 comprises, laterally, an offtake 138 forming a longitudinal groove in the passage of the quarl.

Moreover, the burner comprises an igniting device 140. The latter, shown in FIG. 4, is fixed to the end wall 114. For this purpose, the end wall has a circular opening 142 extended to the outside by a support tube 144. The latter emerges inside the shell 108. The axis Z—Z of the tube 144 makes an angle of approximately 5° with the axis X—X of the set of pipes 106.

Premixing means 146 comprising, at one end, a connector for connection to a fuel-mixture supply, not shown, are carried at the free end of the tube 144. The other end of the premixing means 146 is extended by a tube 148 fitted inside the tube 144 and extending through the shell 108. The free end of the tube 148 emerges in the quarl upstream of the outlet plane of the pipes 106. In particular, the distance separating the end of the tube 148 from the ends of the pipes 106 is, for example, 5 cm.

In order to allow the tube 148 to pass through the small-diameter portion of the quarl, the latter comprises a second offtake 150 angularly offset with respect to the first offtake 138.

Finally, as shown in FIG. 5, the end wall 114 comprises a window 152 formed by a disc of transparent material fixed in a sealed manner into the end wall 114. This window allows visual access to the inside of the burner and, especially, makes it possible to look at the flame when the burner is operating.

It will be understood that with the arrangement of the auxiliary members provided in this alternative embodiment the latter are also protected from the thermal radiation coming from the flame maintained by the burner, since the auxiliary members are placed upstream of the zone where the fuel gas mixes with the oxygen-rich gas. In addition, as previously, the three auxiliary members are swept with the stream of oxygen-rich gas, thereby ensuring that they are continuously cooled.

In this embodiment, the set of fuel gas injection pipes 106 is removably mounted on the end of the tube 120, Thus, it is easy to replace the pipes 106 and to carry out preventive maintenance operations on them without it being necessary to remove the auxiliary members carried directly by the body 104.

In fact, removing just the pipes 106 may be accomplished by unlocking the ring 128 and extracting therefrom the end fitting 124 supporting the pipes.

In both embodiments, the presence of the igniting device to the rear of the zone where the fuel gas mixture mixes with the oxygen-rich gas is conducive to good flame retention at the end of the injection pipes, whatever the fuel used in the burner. This is because, with this arrangement, ignition takes place immediately at the outlet of the injection pipes.

On the other hand, in the devices of the prior art in which the igniting device emerges in the quarl, the mixture is ignited in the quarl at a certain distance from the outlet of the injection pipes so that the fuel must undergo progressive combustion in the reverse direction to the flow of the stream so as to ensure flame retention. Such a travel of the combustion front does not always take place satisfactorily, especially when the fuel is a liquid fuel and the fuel flow rate is high.

Of course, the fuel and oxygen-rich gas inlets may be reversed, while still maintaining good protection of the auxiliary members which are then in contact only with the fuel.

The flame may be analysed on the basis of the single measurement of the intensity of the ultraviolet radiation since, contrary to what might be thought, the radiated intensity does not vary with the power of the burner. Thuds, whatever the flow rate of the fuel gas and of the oxygen-rich gas in the burner, the intensity measured in the flame retention zone remains virtually constant.

A conceivable hypothesis tending to explain this phenomenon consists in assuming that the mixing zone, located immediately downstream of the fuel-injection plane of the fuel pipes, is saturated with ultraviolet rays whatever the fuel gas flow rate. Thus, positioning the measurement device upstream of the injection zone, which allows sighting of the mixing zone immediately at the outlet of the injection pipes, that is to say the flame retention zone, makes it possible to measure the intensity which does not depend on the thermal power delivered by the burner, thus allowing simple analysis of the signal to be carried out so as to deduce therefrom the state of operation of the burner.

What is claimed:

1. A system comprising:
    a quarl including a passage having opposite first and second openings, the passage having a first inner diameter adjacent to the first opening, the passage having a second inner diameter adjacent to the second opening, the first inner diameter being less than the second inner diameter, and the passage having a transition zone between the first and second openings having an inner diameter between the first inner diameter and the second inner diameter; and
    a burner mounted in said first opening, said burner extending into said passage and not extending out of said second opening, the burner comprising:
        at least one fuel supply pipe having an outlet, the at least one fuel supply pipe extending along a fuel supply axis;
        at least one pipe having an outlet for supplying an oxygen-rich gas, the outlets of the at least one fuel supply pipe and the at least one oxygen-rich gas pipe being directed in the same outlet direction and to a flame retention zone where fuel gas from said at least one fuel supply pipe and oxygen-rich gas from said at least one oxygen-rich gas pipe meet, the burner being configured to be mounted through a wall of a furnace with the pipes directed into the furnace;
        a plurality of auxiliary members for acting on the flame, the auxiliary members being positioned in the burner upstream of the flame retention zone and offset from said fuel supply axis and being directed at said flame retention zone;
    wherein said outlet of said at least one fuel pipe is positioned in said quarl passage transition zone.

2. A system according to claim 1, further comprising a body containing the pipes, the body being open only towards the outlets of the pipes and including at least one tap for connection to a supply of oxygen-rich gas, the body comprising the oxygen-rich gas supply pipe, the body being penetrated by the at least one fuel supply pipe, and the plurality of auxiliary members being attached to the body so that the plurality of auxiliary members are swept with the flow of oxygen-rich gas when oxygen-rich gas flows through the at least one oxygen-rich gas supply pipe.

3. The burner according to claim 2, the at least one fuel supply pipe is removably mounted on the body.

4. A system according to claim 1, wherein the plurality of auxiliary members include a main operating axis which defines with the pipes outlet direction an angle of between 0 and 45°.

5. A system according to claim 1, wherein the plurality of auxiliary members comprise a device for igniting the flame.

6. The burner according to claim 5, wherein the device for igniting the flame comprises a tube for supplying an igniting flame, which flame igniting tube has an outlet end placed at a distance of between 2 cm and 10 cm upstream of the zone where the fuel meets the oxygen-rich gas.

7. A system according to claim 1, wherein the plurality of auxiliary members comprise a window.

8. A system according to claim 1, wherein the plurality of auxiliary members comprise a device for analyzing the flame.

9. The burner according to claim 8, wherein the device for analyzing the flame comprises a cell capable of measuring the light intensity in the ultraviolet zone produced by the flame, and in that the cell is connected to means for comparing the measured light intensity with at least two predetermined threshold values in order to deduce therefrom that the burner is in an incorrect operating state.

10. The burner according to claim 2, wherein the plurality of auxiliary members include a main operating axis which defines with the pipes outlet direction an angle of between 0 and 45°.

11. The burner according to claim 3, wherein the plurality of auxiliary members include a main operating axis which defines with the pipes outlet direction an angle of between 0 and 45°.

12. The burner according to claim 4, wherein the angle between the main operating axis and the pipes outlet direction is between 0° and 20°.

13. The burner according to claim 10, wherein the angle between the main operating axis and the pipes outlet direction is between 0° and 20°.

14. The burner according to claim 11, wherein the angle between the main operating axis and the pipes outlet direction is between 0° and 20°.

15. The burner according to claim 2, wherein the plurality of auxiliary members comprise a device for igniting the flame.

16. The burner according to claim 3, wherein the plurality of auxiliary members comprise a device for igniting the flame.

17. The burner according to claim 2, wherein the plurality of auxiliary members comprise a window.

18. The burner according to claim 3, wherein the plurality of auxiliary members comprise a window.

19. The burner according to claim 2, wherein the plurality of auxiliary members comprise a device for analyzing the flame.

20. The burner according to claim 3, wherein the plurality of auxiliary members comprise a device for analyzing the flame.

* * * * *